July 10, 1962     D. PETIRROJO     3,043,618
PROTECTIVE DEVICE FOR MOTOR VEHICLES
Filed Nov. 1, 1960     4 Sheets-Sheet 1

INVENTOR.
Diego Petirrojo
BY
Victor J. Evans & Co.
ATTORNEYS

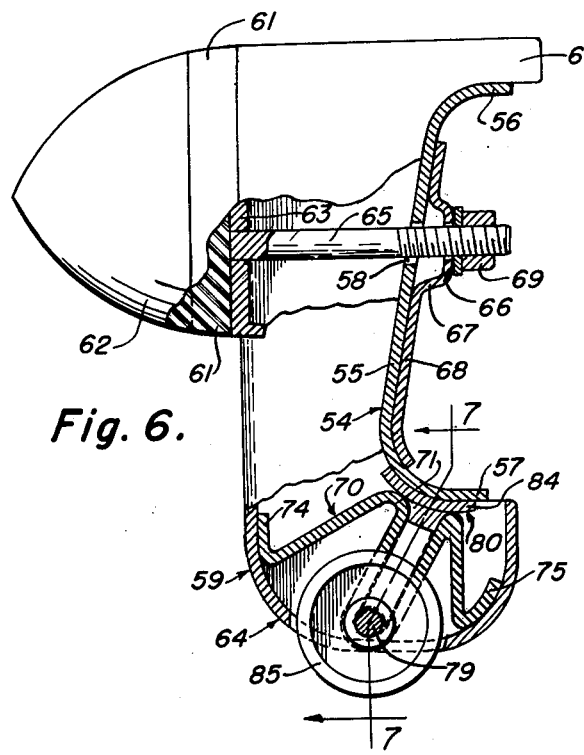
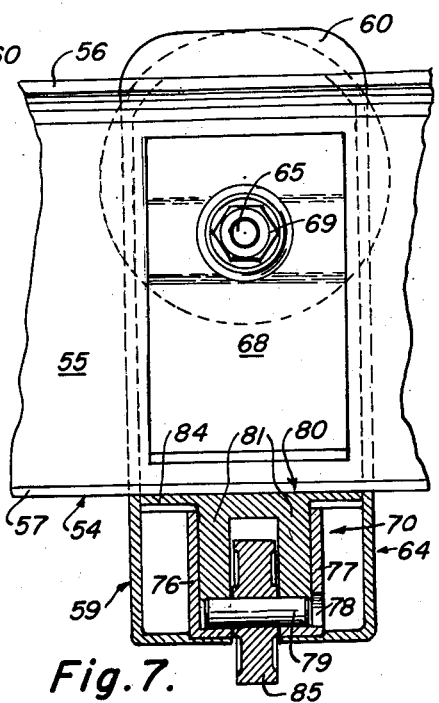
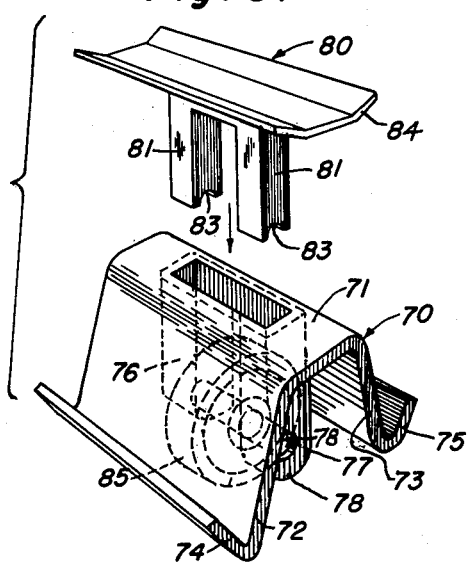
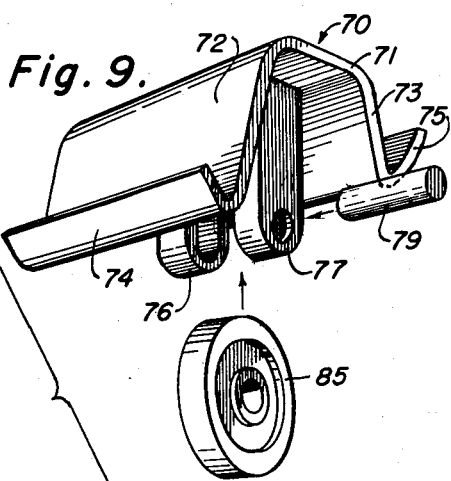

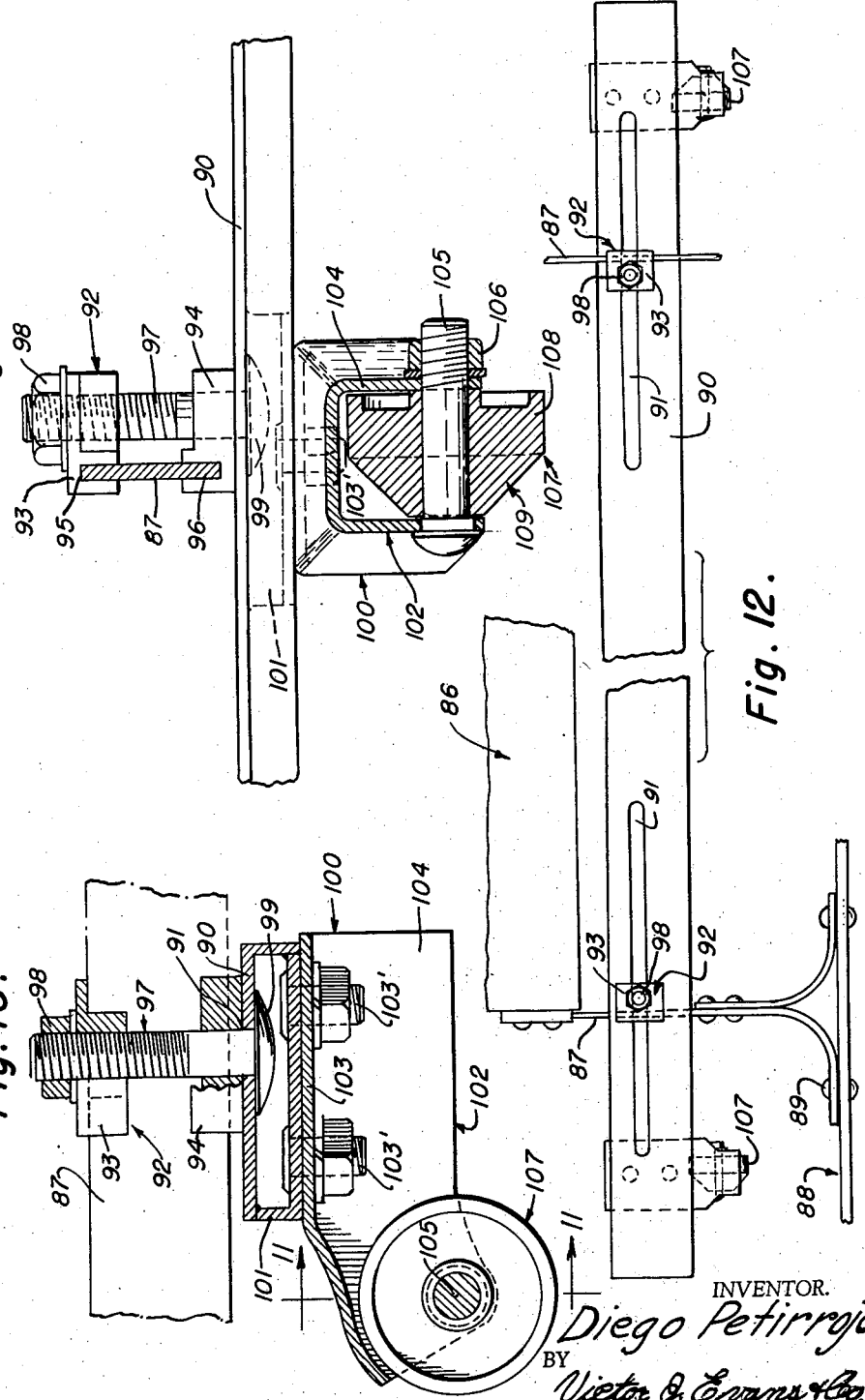
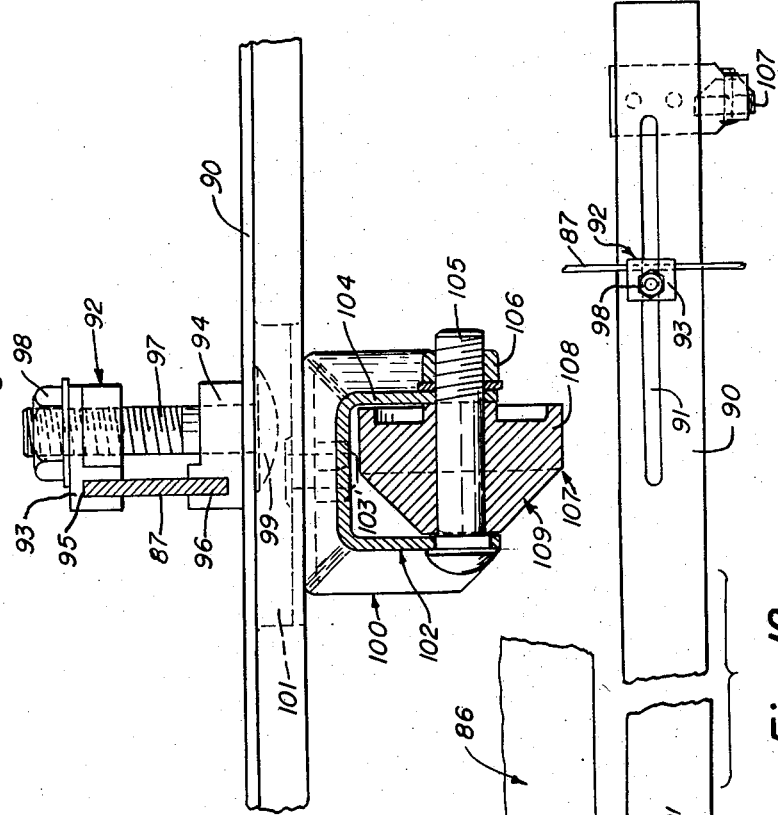
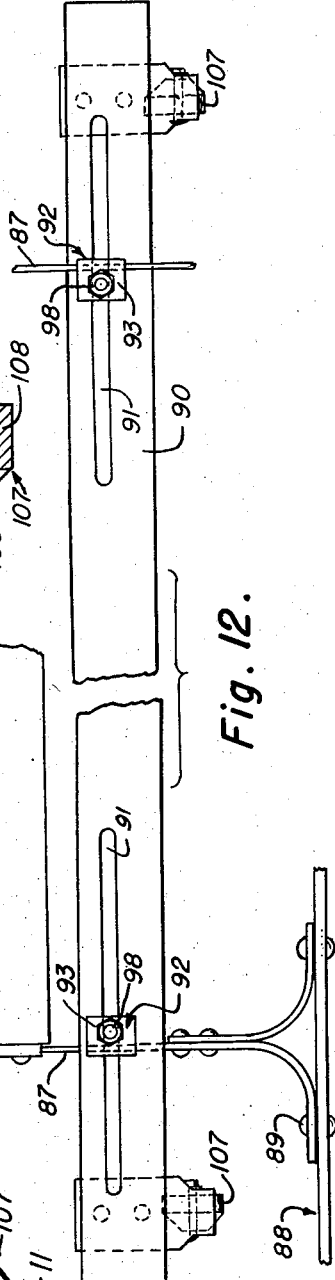

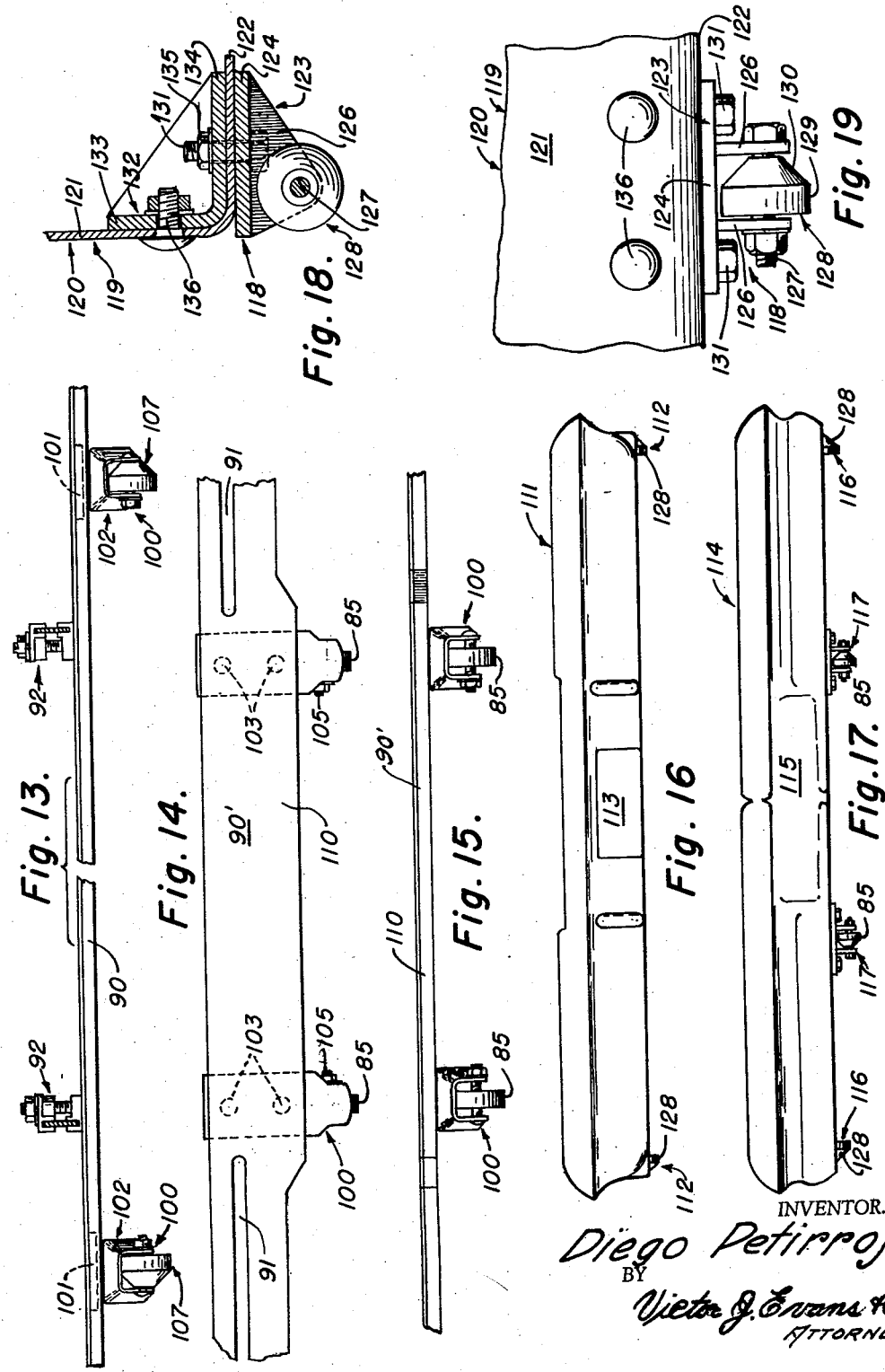

United States Patent Office 3,043,618
Patented July 10, 1962

3,043,618
PROTECTIVE DEVICE FOR MOTOR VEHICLES
Diego Petirrojo, 127 Florida St., Buffalo 8, N.Y.
Filed Nov. 1, 1960, Ser. No. 66,591
1 Claim. (Cl. 293—66)

This invention relates to a vehicle such as an automobile, truck, trailer or the like, and more particularly to a protective device for such a vehicle.

The primary object of this invention is to provide a protective device for a vehicle wherein the undercarriage or lower portion of the vehicle will be prevented from scraping on a road surface or other area as for example when the vehicle is traveling up an incline or down a sloping surface, or when the vehicle encounters or travels over depressions or the like.

A further object is to provide a vehicle protective device which consists of wheel supporting units that are adapted to be readily fastened to suitable portions of the vehicle such as the vehicle bumper or to the vehicle chassis so that when the vehicle is being used and when uneven surfaces are encountered or driven over by the vehicle, the wheel units of the present invention will engage the road surface or other area in order to prevent the bumper or other portions of the vehicles from scraping on the ground so that damage to the undercarriage or other parts of the vehicle will be prevented or minimized.

Still another object is to provide such a vehicle protective device that is economical to manufacture and efficient in operation and which is rugged in structure and foolproof in use.

These and other objects of the invention will become apparent from a reading of the following specification and claim, together with the accompanying drawings, wherein like parts are referred to and indicated by like reference characters and wherein:

FIGURE 6 is an elevational view of a modified protective device, with parts broken away and in section.

FIGURE 7 is a sectional view taken on the line 7—7 of FIGURE 6.

FIGURE 8 is a perspective view showing certain of the elements of the device of FIGURES 6 and 7 in disassembled or separated relationship.

FIGURE 9 is a perspective view illustrating certain constructional details of the device of FIGURES 6, 7 and 8 and with the parts separated.

FIGURE 10 is an elevational view, with parts broken away and in section of another modification.

FIGURE 11 is a sectional view taken on the line 11—11 of FIGURE 10.

FIGURE 12 is a fragmentary plan view illustrating the device of FIGURES 10 and 11 being used.

FIGURE 13 is a view taken generally at right angles to the view shown in FIGURE 12.

FIGURE 14 is a view similar to FIGURE 12 but illustrating a modification.

FIGURE 15 is a view taken at right angles to the view shown in FIGURE 14.

FIGURE 16 is an elevational view of a further modification.

FIGURE 17 is an elevational view of another modification.

FIGURE 18 is a sectional view of a still further modification.

FIGURE 19 is an elevational view taken at right angles to the view shown in FIGURE 18.

Figure 1:
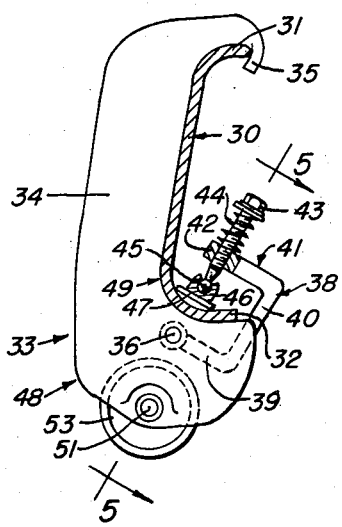
FIGURE 1 is a sectional view of a vehicle bumper and showing a protective device constructed according to the present invention and connected to the bumper.
Figure 2:
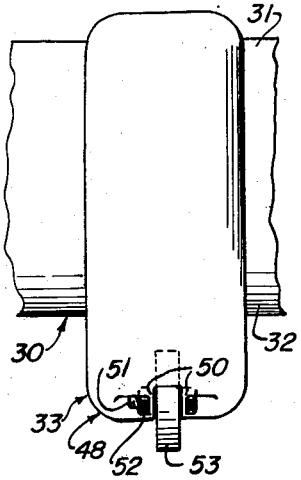
FIGURE 2 is a view taken at right angle to the view shown in FIGURE 1.
Figure 3:
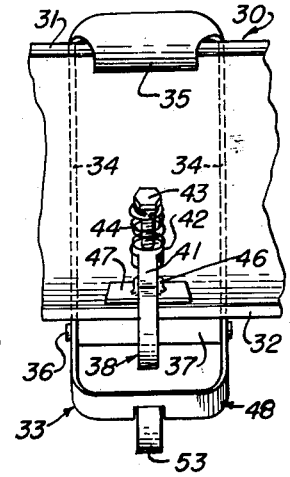
FIGURE 3 is a view looking at the opposite side of FIGURE 2.
Figure 4:
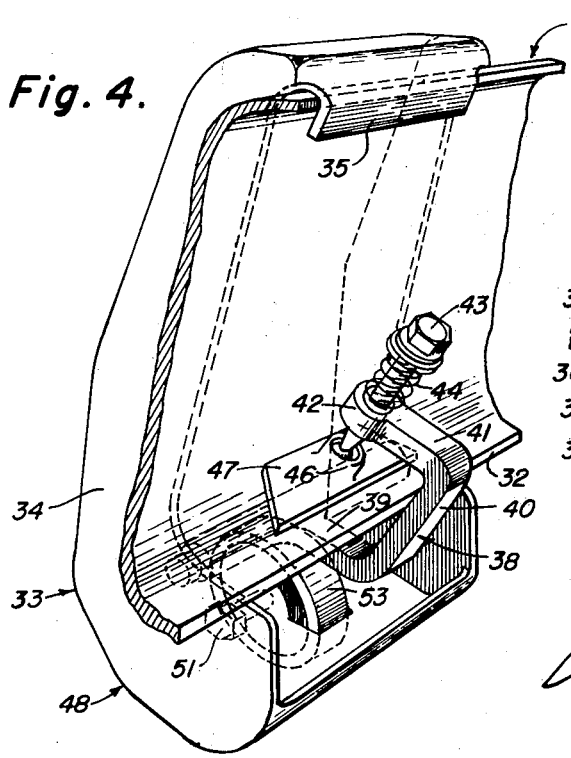
FIGURE 4 is a perspective view of the device of FIGURES 1, 2 and 3.
Figure 5:
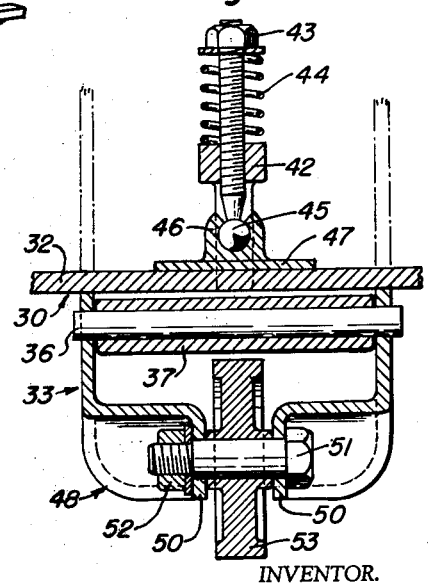
FIGURE 5 is a sectional view taken on the line 5—5 of FIGURE 1.

Referring in detail to the drawings, and more particularly to FIGURES 1 through 5 of the drawings, the numeral 30 indicates a portion of a vehicle bumper which may be the front or rear bumper of an automobile or the like, and the bumper 30 includes a top edge 31 and the bottom edge 32, and according to the present invention there is provided one or more protective devices which is indicated generally by the numeral 48, and in FIGURES 1 through 5 the protective devices 48 are suitably connected to the bumper 30. Each of the protective devices 48 includes a support member as indicated generally by the numeral 33, and the support member 33 includes spaced parallel side portions 34 which are provided with recesses 49 for snugly receiving therein the bumpers 30. The support member 33 is further shaped to include a hook 35 on the upper end thereof which engages the top portion 31 of the bumper 30, and as shown in FIGURE 5 for example a pin 36 extends between the side portions 34 of the support member 33. A bushing 37 is mounted on the pin 36, and the numeral 38 indicates a C clamp, and the C clamp 38 has a lower portion 39 which is secured to or formed integral with the bushing 37. The clamp 38 further includes an upstanding portion 40 which terminates in a transverse portion 41 and the portion 41 is provided with an enlargement 42 thereon. The numeral 43 indicates a screw member which threadedly engages the portion 42, and a coil spring 44 is circumposed on the screw member 43. The lower end of the screw member 43 engages a ball 45 that is mounted in a shoulder 46 which is formed on the upper portion of a plate 47, and the plate 47 engages the upper surface of the lower portion of the bumper 30 as for example as shown in FIGURE 1.

Depending from the lower portion of the support member 33 is a pair of spaced parallel flanges 50, and a bolt 51 which defines an axle extends between these flanges 50, there being a nut or fastener 52 arranged in threaded engagement with an end portion of the bolt 51. The numeral 53 indicates a wheel which is interposed between the flanges 50, and the wheel 53 is mounted on the axle 51.

Referring now to FIGURES 6 through 9 of the drawings there is illustrated a modification wherein the numeral 54 indicates a portion of a bumper which may be the front or rear bumper of a vehicle such as a truck, bus, automobile, or the like, and the bumper 54 includes an intermediate main body portion 55 as well as upper and lower transverse end portions 56 and 57, and the bumper 54 is provided with an opening or aperture 58 therein, FIGURE 6. The numeral 59 indicates a support member which includes a top section 60 that engages the upper portion 56 of the bumper 54, and the numeral 61 indicates a wall portion of annular formation which is contiguous to the wall 63 of the support member 59, and a resilient or yieldable guard or body member 62 is suitably secured in the wall portion 61. The protective device of FIGURE 6 is indicated generally by the numeral 64, and it is to be understood that one or more of the protective devices 64 can be attached to a bumper such as the bumper 54 as described, although only one has been illustrated since it is believed that a description and illustration of one will suffice for the others.

The numeral 65 indicates a bolt or stud which is secured as by welding to the wall 63 of the support member 59, and the stud 65 projects through the aperture 58 in the bumper 54, and the stud 65 also projects through an aperture or opening 66 in a shoulder 67 of a plate member 68 which is arranged contiguous to the inner surface of the bumper 54, and a fastener or nut 69 is arranged in threaded engagement with the threaded portion of the stud 65 for helping to maintain the parts in their proper assembled position.

Mounted in the lower portion of the support member 59 is a sustainer unit 70, FIGURE 8, and the sustainer unit 70 includes an upper section 71 as well as a pair of angularly arranged spaced apart wall sections 72 and 73 which terminate in transverse lips 74 and 75 for engaging the lower inner portion of the support member 59. Spaced apart fingers 76 and 77 depend from the upper section 71 and are secured thereto or formed integral therewith, and these fingers 76 and 77 are hollow for a purpose to be later described. The finger 77 is provided with an aperture or opening 78 in its lower end whereby a pin or axle 79 can be extended therethrough.

The numeral 80 indicates a bracket which comprises a pair of spaced parallel legs 81 that are adapted to be received in the hollow fingers 76 and 77, and the lower ends of the legs 81 are shaped arcuately or recessed as at 83 for engaging the axle 79. The bracket 80 also includes an arcuate lip 84 on the upper portion thereof for engaging the lower portion 57 of the bumper 54 when the parts are in their assembled position. The numeral 85 indicates a wheel which is journaled on the axle 79, and the wheel 85 is mounted between the pair of legs 81.

Attention is now directed to FIGURES 10 through 13 of the drawings wherein there is illustrated a further modification and wherein the numeral 86 indicates a portion of a conventional vehicle such as an automobile body, and the numeral 87 indicates usual braces which are adapted to be used for connecting the front or rear bumper 88 to the chassis or other portion of the vehicle 86, FIGURE 12. The braces 87 may be connected to the bumper 88 as at 89.

The numeral 90 indicates a bar which is adapted to be arranged transversely below the braces 87, and the numeral 100 indicates the protective devices for use with the assembly of FIGURES 10 through 13. The bar 90 is provided with spaced apart elongated slots 91, for a purpose to be later described. Clamps 92 are provided for connecting the bar 90 to the braces 87, and the clamps 92 include upper and lower jaws 93 and 94 which are provided with opposed slots 95 and 96 therein, FIGURE 11 and these slots 95 and 96 are adapted to snugly receive therein the braces 87. The numeral 97 indicates a securing element or bolt which is adapted to extend through a slot 91 and through suitable openings in the jaws 94 and 93 and a fastener or nut 98 is arranged in threaded engagement with the upper end of the securing element 97. The securing element 97 is provided with a head 99 on its lower end, FIGURE 10.

Spaced apart base elements 101 of L-shaped formation are secured as by welding the portions of the bar 90, and support members 102 are affixed to the base elements 101 as shown in the drawings. The support members 102 each include a top section 103 as well as side walls 104, and an axle 105 extends between the side walls 104, and the axle or pin 105 has a fastener or nut 106 thereon. The numeral 107 indicates a wheel which is journaled on the axle 105, and the wheel 107 includes a cylindrical section 108 as well as a tapered or cone shaped section 109.

Referrings now to FIGURES 14 and 15 of the drawings, the numeral 90' indicates a modified bar which is adapted to be used in generally the same manner as the previously described bar 90 of FIGURES 10 through 13. However the bar 90' of FIGURES 14 and 15 is provided with an intermediate enlarged portion 110.

Attention is directed to FIGURE 16 of the drawings, wherein the numeral 111 indicates a different type of bumper which may be suitably connected to the front or rear of a vehicle such as an automobile, and protective devices 112 are suitably mounted adjacent the lower end portions of the bumper 111, and the bumper 111 is provided with an intermediate area 113.

In FIGURE 17 there is shown a further modification wherein the numeral 114 indicates a different type of vehicle bumper which includes an intermediate area 115, and end protective devices 116 as well as intermediate protective devices 117 are adapted to be suitably connected to the bumper 114.

Referring now to FIGURES 18 and 19 of the drawings, the numeral 118 indicates generally a different type of protective device which is adapted to be used as for example with a commercial vehicle 120 which may be a trailer, truck body or the like, and the vehicle 120 includes a frame work or body portion 119 which comprises an upstanding section 121 as well as a lower or horizontally disposed section 122. A support member 123 is mounted beneath the section 122 and the support member 123 includes a top section 124 which is connected to the vehicle body as at 131, and the support member 123 further includes depending flanges or side portions 126 which have an axle 127 journaled therebetween. A wheel 128 is mounted on the axle 127, and the wheel 128 includes a cylindrical section 129 as well as a tapered or cone shaped section 130. As shown in the drawings and in FIGURE 18 in particular, a support piece 132 is adapted to be arranged within the vehicle body 120, and the support piece 132 includes an upstanding section 133 as well as a horizontal section 134 and side sections 135, and the section 133 may be fastened to the portion 121 of the frame work 119 as for example by means of securing elements 136.

From the foregoing, it is apparent that there has been provided a protective device which is especially suitable for use on vehicles such as automobiles, and wherein with the present invention damage to the undercarriage or other portions of an automobile or other vehicle will be minimized or prevented, as for example when the vehicle is traveling up or down an incline or when the vehicle travels over rough spots in a road and it is to be noted that with the present invention one or more wheel assemblies are adapted to be suitably affixed to a suitable portion of the vehicle such as the front or rear bumper of the vehicle or to a portion of the vehicle body or chassis. Then, in the event the vehicle encounters an incline or rough spot in the road or other location, the wheel of the present invention will contact the road surface or ground surface so that the undercarriage of the vehicle will be prevented from coming in contact with the ground so that scraping of the undercarriage or other damage thereto will be prevented.

Considering in detail the device of FIGURES 1 through 5, it will be seen that the protective device 48 is constructed as arranged, and one or more of such protective devices 48 are adapted to be connected to a bumper 30 and the bumper 30 may either be the front or rear bumper of an automobile or other vehicle. The protective device 48 is constructed so as to include the support member 33 and the support member 33 is provided with the side walls 34 which have the recesses 49 therein and these recesses 49 snugly receive or engage or conform to the configuration of the bumper 30. The hook 35 on the upper end of the support member 33 engages the top 31 of the bumper 30 so as to help maintain the support member connected to the bumper. The provision of the bushing 37 which is swivelly mounted on the pin 36, and wherein the C clamp 38 is secured to or formed integral with the bushing 37 insures that when the device 48 is being mounted on or removed from the bumper, the screw member 43 can be loosened so that the clamp 38 can be swiveled about an axis extending through the pin 36 in order to prevent complete disengagement of the unit or device 48 or attachment of the device 48 to the bumper. When the protective device 48 is being used, the screw member 43 is tightened in the enlargement 42 of the clamp 38 so that the lower end of the screw member 43 engages the ball 45, and the ball 45 is supported in the shoulder 46 on the plate 47, the plate 47 engaging the upper surface of the bottom portion 32 of the bumper 30. The spring member 44 helps to maintain tension on the screw member or bolt 43 so that accidental loosening or movement of the screw member 43 is prevented.

The support member 33 is provided with the depending flanges 50 which have the axle 51 extending therethrough, and the wheel 53 is journaled on the axle 51 between the flanges 50. Thus, with one or more of the protective devices 48 mounted on a bumper such as the bumper 30, it will be seen that when the vehicle encounters an inclined or rough surface such as a rough roadway, the wheel 53, being arranged below the bumper, will contact the ground or road surface so as to prevent the lower edge of the bumper from scraping on the ground, and also the wheel 53 will prevent the undercarriage or other portion of the vehicle from scraping the ground so that damage to such parts will be prevented.

In the modification of FIGURES 6 through 9 the numeral 64 indicates a protective device, and it is to be understood that one or more of such protective devices 64 are adapted to be connected to a bumper such as the bumper 54 and the bumper 54 may be the front or rear bumper of an automobile or other vehicle. The protective device 54 includes the support member 59 which is shaped to conform to or engage the bumper 54, and the support member 59 includes the upper portion 60 which extends over the top 56 of the bumper 54. In addition the support member 59 has a guard 62 which may be made of rubber or other suitable material so as to offer protection against other objects which the vehicle may encounter. The support member 59 is fastened to the bumper 54 by means of the stud 65 which has one end secured as by welding to the wall 63 of the support member 59, and the stud 65 has a fastener 69 arranged in threaded engagement therewith, the stud 65 extending through the aperture 58 in the bumper 54, and the stud 65 also extending through an aperture 66 in a shoulder 67 of the plate member 68 which is arranged on the opposite side of the bumper 54 from the support member 59. This construction serves to insure that the support member 59 will be maintained firmly affixed or fastened to the bumper.

In addition the protective device 64 has mounted in the lower portion thereof the sustainer unit 70 which is constructed as shown in FIGURES 8 and 9, and the sustainer 70 fits snugly in the lower curved portion of the support member 59. The sustainer unit 70 includes the upper section 71 as well as the angularly arranged wall sections 72 and 73 which terminate in the lips 74 and 75, and these lips 74 and 75 bear against or engage portions of the suport member 59 so that the sustainer unit will be maintained in its proper location within the lower portion of the support member. In addition the sustainer unit 70 is provided with depending spaced apart fingers 76 and 77 which are hollow and these hollow fingers 76 and 77 are adapted to receive the spaced apart plugs or legs 81 of the bracket 80, and the bracket 80 includes the arcuate upper portion 84 which is adapted to bear against the lower portion 57 of the bumper so that the entire assembly will be maintained firmly mounted in its proper location. The opening 78 in the lower end of the finger 77 permits the axle or pin 79 to be readily inserted therethrough and the lower ends of the legs 81 are shaped arcuately as indicated by the numeral 83 for engaging the axle 79, and the wheel 85 is journaled on the axle 79 between the legs 81 as for example as shown in FIGURE 7. Thus, with one or more of the protective devices 64 mounted on a bumper such as the bumper 54, it will be seen that as the vehicle is being used and when the vehicle engages an inclined surface or rough portion of a roadway or the like, the wheel 85 will engage the roadway so as to prevent the bumper 54 or undercarriage of the vehicle from scraping on the road in order to insure that such parts will not be damaged or harmed.

With further reference to the modification of FIGURES 10 through 13, the numeral 88 indicates a bumper which may be the front or rear bumper of a vehicle such as an automobile and the numeral 86 indicates an end portion of such a vehicle, FIGURE 12. The bumper 88 is supported from the vehicle body or chassis by the usual braces 87, and it will be seen that according to the structure shown in FIGURES 10 through 13 a horizontally disposed angle iron or bar 90 is arranged transversely below the braces 87 which may be used for supporting the bumper. The clamp 92 provides a convenient means for attaching the bar 90 and protective device 100 to the braces 87. The clamp 92 includes the upper and lower jaws 93 and 94 which have the slots 95 and 96 respectively for snugly receiving therein upper and lower portions of the braces 87, and the stud or securing element 97 has its head 99 positioned below the bar 90 and the shank of the securing element 97 extends through a slot 91 in the bar 90. Due to the provision of the elongated slots 91, it will be seen that the clamp 92 can be adjusted. Thus, by loosening the nut 98, the clamps 92 can be shifted or adjusted to the desired position, since the shanks of the securing element 97 extend through the slots 91, and after these parts have been moved from their desired location, the nuts 98 are tightened so as to maintain the jaws 93 and 94 in engagement with the brace 87 so that the clamp 92 will be held in its proper location on the brace.

In addition the bar 90 is provided with one or more of the base elements 101 which are secured as by welding to the bar 90, and these base elements 101 each have a support member 102 connected thereto as for example by means of bolt and nut assemblies 103', FIGURE 10. The support members 102 each serve to support a wheel 107 through the medium of the axle 105, and the wheels 107 each include the cylindrical section 108 as well as the tapered section 109. With the parts arranged as shown in FIGURES 10 through 13, with a rough spot in the road or other locality is encountered, the wheel 107 will engage the road so as to prevent the bumper such as the bumper 88 or the undercarriage of the vehicle from scraping or rubbing on the ground so that the wheel 107 and its associated parts will function as a protective means for the vehicle.

Instead of using a bar 90 as shown in FIGURES 12 and 13, a bar 90' may be utilized, and the bar 90' may be provided with a bulging or enlarged intermediate portion 110, and a pair of the spaced apart protective devices 100 are adapted to be suitably fastened below the bar 90' for the same purpose as previously described. The protective devices of FIGURE 14 may be provided with ground engaging wheels such as the wheels 85 instead of the wheels 107.

In FIGURE 16 a different type of bumper 111 is shown equipped or provided with wheel units 112 and these wheel units 112 are adapted to engage the ground or road surface in order to prevent the bumper from scraping on the ground as the vehicle travels along a particular locality or area.

In FIGURE 17 a still further type of bumper 114 having an intermediate area 115 is shown equipped with protective devices or wheel assemblies 116 and 117 which serve to prevent the lower edge of the bumper or undercarriage from scraping on the ground.

In FIGURES 18 and 19 the protective device 118 is shown wherein it can be used below different types of structures such as a trailer body, truck body, or beneath a suitable portion of a vehicle such as an automobile and with the parts arranged as shown in FIGURES 18 and 19 the support member 123 is fastened as at 131 to the frame 119 of the vehicle body 120, and the support piece 132 helps provide a reinforcement or bracing assembly for the support member 123. The securing elements 136 help connect the support piece 132 to the frame 119. The wheel 128 is journaled on the axle 127 which extends between the sides 126 of the support member 123. When using one or more of the protective devices 118 of FIGURES 18 and 19, various portions of mobile equipment can be protected and such equipment when equipped with the protective devices 118 will be prevented from scraping or otherwise rubbing on the ground or other surface.

The parts can be made of any suitable material and in different shapes or sizes.

The mechanical safety device of the present invention will function as a bumper saving mechanism and will prevent or stop unnecessary scraping damage which occurs to the overhanging rear end or the overhanging front end of a motor vehicle or trailer as it ascends or descends a steep inclined plane.

It will be seen that there has been provided a bumper saver which is in the nature of a mechanical safety device that will prevent or stop unnecessary damage caused by the severe hitting, bumping or scraping against the pavement, concrete or asphalt road of the front or rear bumper or the lowest part of the overlapping rear end or the lowest part of the overlapping front end of a motor vehicle such as a trailer as it ascends or descends a steep inclined plane such as a steep driveway or steep hill.

With the present invention the overlapping rear end or the overlapping or overhanging front end of a motor vehicle or trailer on wheels is mounted on safety wheels so as to give both ends full protection from being damaged. A dolly-like action of easy rolling of these ends will be insured when the vehicle ascends or descends a steep incline so as to prevent unnecessary scraping damage occurring to such vehicles and the bumper saver wheels will roll on the road so that the bumper or overhanging front or rear end will not scrape the road.

The bumper saver embodies a unique wheel which is held in place in a support member and in certain instances a round wheel such as the wheel 53 may be utilized, while in other instances a wheel such as the wheel 128 having the cylindrical section 129 and the tapered section 130 may be used. In FIGURES 16 and 17, the outermost protective devices 112 and 116 include wheels 128 which may be referred to as curb wheels and these curb wheels are located at the extremities, both left and right of a bumper such as the bumper 111 or the bumper 114, immediately below the lower portion of the bumper region of the vehicle but within the area thereof. The curb wheel 128 is affixed in its support member with its tapered end 130 pointing outward towards the outside of the vehicle and the special design or construction of the vehicle 128 having the one tapered end 130 is such that it can handle the ascending and descending of the overlapping end of the vehicle with ease as it comes in contact with the oncoming road or walk approaching it from an angle. In addition the taper 130 of this wheel permits the wheel to roll freely once contacting the steep grade without damaging the wheel itself or causing strain on it or the support member and for this reason this wheel is placed at the ends of the bumper region as previously stated.

In figures such as FIGURES 1 through 5 the wheel 53 may be referred to as a lead wheel of the bumper saver and also in FIGURE 17 the protective devices 117 include wheels similar to the wheels 53. While the curb wheel is used on all vehicles to which it is attached, such as motor vehicles and trailers to take care of the corners of the vehicle in its ascending or descending of a steep inclined plane, the lead wheel assembly such as the assembly 117 or the assembly 48 is used only on vehicles having a V type lower front end or lower rear end and on vehicles having a rounded or bulging type lower front end or rear end. The lead wheel is placed or affixed in its support member on both sides of the vehicle's dead center sufficiently separated to handle the job of dolly service to the overlapping front end or rear end of said vehicle in ascending or descending an inclined plane headon and not from an angle.

It will be noted that as the vehicle ascends or descends an inclined plane headon, straight forward or backward in motion, the lead wheel of the bumper saver strikes the oncoming road or pavement first so as to dolly the overhanging lower front end or rear end safely down or up the inclined plane without any scraping damage of the ends of the vehicle taking place. The bumper saver wheels hang freely from their support members which are located just below the bumper region of the vehicle and which extend just below the body line of the vehicle and the bumper saver of the present invention is so designed or constructed that its wheel will contact the ground first on any occasion of ascending or descending a steep inclined plane.

The support member for the bumper saver wheel can be made in different styles or shapes but in all cases the wheel of the bumper saver extends below the body line or region of the vehicle. The bumper saver produces a safety factor and feature of a dolly action which safe guards the overlapping front ends and rear ends of motor vehicles or trailers to which it is attached whether they have already been made or whether they are to be made in the future so as to protect the front and rear ends of the vehicle from having unnecessary scraping damage inflicted thereon as the vehicle ascends or descends steep inclined planes or surfaces.

In the device of FIGURES 1 through 5, the bumper saver or protective device 48 can be made portable so that it can be attached to any suitable place on a bumper 30 and the numeral 53 indicates the lead wheels of the protective bumper saver which is mounted on the axle 51. The clamp 38 is hingedly supported as at 36, and the numeral 45 indicates a ball joint connection contiguous to the adjusting bolt or screw member 43.

In attaching the portable bumper saver 48, the unit may be held with the bottom end pointing upward, and the hook 35 can be placed on top of the bumper 30, and the lip of the hook is hooked on behind the top side of the bumper, and then the bottom end of the portable bumper saver is brought down so that it fits closely to the bumper as shown in the drawings. The C clamp 38 which pivots on the hinge pin 36, can then be swung into place and the plate 47 is lowered by adjusting the screw or bolt 43 and the parts are then tightened, and the springs 44 maintain tension on the adjusting bolt 43. The bolt 51 with the nut 52 thereon functions as the axle for the wheel 53. In the event that a wheel 53 gets worn down too much or broken it can be easily removed and replaced by a new wheel without any difficulty.

In FIGURES 6 through 9 there is illustrated an attachable bumper guard type bumper saver 64 which can be attached on any vehicle with very little effort and the device 64 can be used as a replacement for the conventional type bumper guard. The unit 64 is held in place by means of the stud 65 and nut 69, and the numeral 68 indicates a reinforcing plate behind the bumper, and the numeral 70 indicates a sustainer unit in which the axle 79 of the lead wheel 85 is placed and which is held securely in place by the lower arcuate ends 83 of the plugs or legs 81 of the bracket 80. The sustainer unit 70 is provided with front and rear pressure lips 74 and 75 and these lips are used when the entire bumper saver unit is completely assembled and inserted in the support member so that as the parts are tightened, pressure will be applied to these lips and the parts will be maintained in their proper location.

The portable attachable bumper saver unit of FIGURES 1 through 5, and the attachable bumper saver of FIGURES 6 through 9 are adapted to be used for vehicles having the type of bumper sufficiently low for units to be attached and be effective and in certain instances it is not possible to use these types of bumper savers and for this reason a bumper saver bar unit has been provided.

There are several types or styles of bumper saver security bar units and one is a straight bar type as shown in FIGURES 12 and 13 wherein the bar is indicated by the numeral 90, while in FIGURE 14 there is illustrated a modification wherein the bar 90' has a belly portion or enlarged portion 110 adjacent the central part of the unit. These security bar units, with or without the enlargement 110 are used for vehicles having a straight or V type or bulging overhanging front end of the same type overlapping rear end and each bar unit has in its top sides adjustable slots 91 in which the bolt 97 of the adjustable clamps 92 are mounted so as to permit proper adjustment whereby the clamp can be fastened onto the bumper support arms or braces 87 of the frame of the vehicle. These adjustable movable clamps are necessary since all vehicles do not have the same or equal distances between the bumper support arms 87 so that these bars can be made to fit any type vehicle without any alteration of the vehicle or bar and adjustment is made by merely adjusting the clamps properly on the bar units to the proper distance required for the particular vehicle on which it is mounted.

The security bumper bar support arm adjustable clamps 92 can be used on the vehicle's frame by suitable adjustment of the parts. The bar unit can be made any desired length and for example it can be made short for close situated bumpers support arms or regular length for standard size vehicles as required or desired.

In FIGURES 10 through 13, the numerals 93 and 94 indicate the upper and lower jaws of the adjustable clamp 92 and these jaws after being properly placed on the vehicle bumper support arm or brace 87 are brought together by screwing down of the nut 98, and lock washers and the like can be used wherever desired or required.

If needed a turned under hook lip similar to the hook 35 of FIGURE 1 can be made at the end of the upper adjustable jaw of the security bumper support arm adjustable clamps in the event the clamp is to be attached to or used on a vehicle frame instead of its support arm and such a hook lip on the upper jaw of the adjustable clamp will prevent the clamp from slipping or working back out of position as for example when the unit vibrates by coming in contact with the road.

The security bar 90 can be made in different shapes or sizes as desired so that for example it may have a dip in it or it may be curved and this is immaterial as long as it does the job intended, namely the holding of a protective device such as the device 100 which provides a support for the bumper saver wheel 107 so that the wheel will hang in place just below the body line of the vehicle or bumper area.

The bumper saver support member can be made in the vehicle bumper as part of the bumper and it can be designed so that it is highly esthetic and attractive and wherein it will not detract from the beauty of the appearance of the vehicle. For example in FIGURE 16 there is illustrated a flat safe bumper, while in FIGURE 17 there is shown a bulging or rounded type bumper 114, and in FIGURE 16 the numeral 12 indicates the extended curb wheel support unit.

In FIGURE 17 towards the center of the bumper 114 is the support units 117 having the lead wheels such as the lead wheels 85.

In FIGURES 18 and 19 there is shown a construction which can be used for a commercial vehicle or trailer as a bumper saver and in these views the numeral 123 indicates the ruggedly or heavily constructed support member which is fastened as at 131 and 136 to the vehicle body 120 and the device of FIGURES 18 and 19 is arranged or constructed so that the curb wheel 128 can hang freely and be raised for operation when needed. Suitable braces can be used wherever desired or required in order to prevent unnecessary strain on the various elements or parts.

Minor changes in shape, size and rearrangement of details coming within the field of invention claimed may be resorted to in actual practice, if desired.

What is claimed is:

In a protective device for a vehicle bumper of the type that includes a lower portion, a support member adapted to be connected to the bumper and said support member including spaced parallel side portions provided with opposed recesses for receiving the bumper, a hook on the upper end of the support member for engaging the upper portion of the bumper, a pin extending between the lower side portions of said support member, a bushing on said pin, a clamp having a lower portion affixed to said bushing, said clamp further including an upstanding portion which terminates in a transverse portion and said transverse portion being provided with an enlargement thereon, an adjustable screw member arranged in threaded engagement with said enlargement, a coil spring circumposed on said screw member and said coil spring being arranged above said enlargement, a plate engaging the upper surface of the lower portion of the bumper, and said plate having a shoulder thereon, a ball member supported in said shoulder and engaging the lower end of the screw member, spaced parallel flanges depending from the lower portion of the support member, an axle journaled between said flanges, and a wheel mounted on said axle.

References Cited in the file of this patent
UNITED STATES PATENTS

| | | |
|---|---|---|
| 2,608,430 | Robert | Aug. 26, 1952 |
| 2,834,608 | Wixson | May 13, 1958 |